Patented July 31, 1945

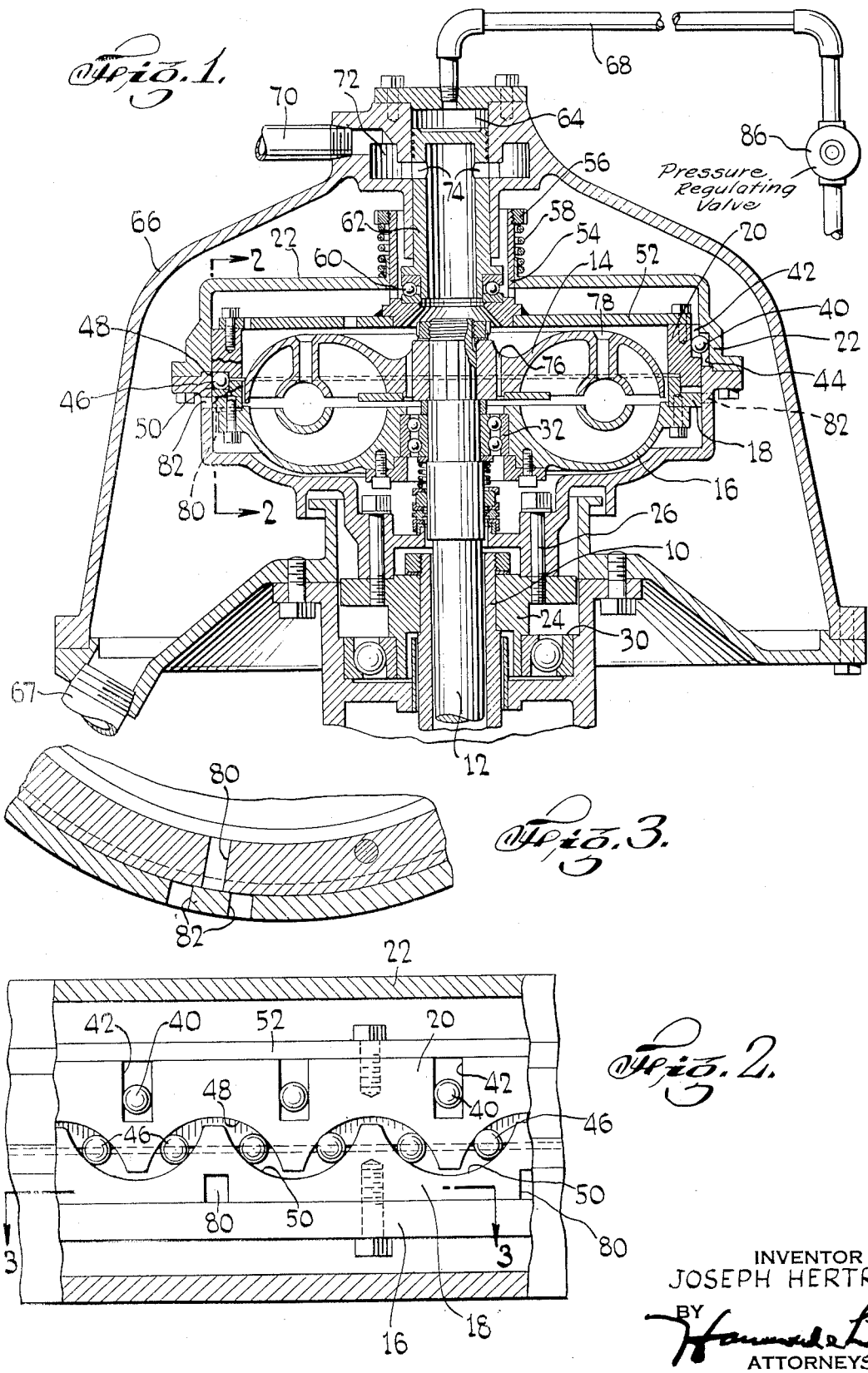

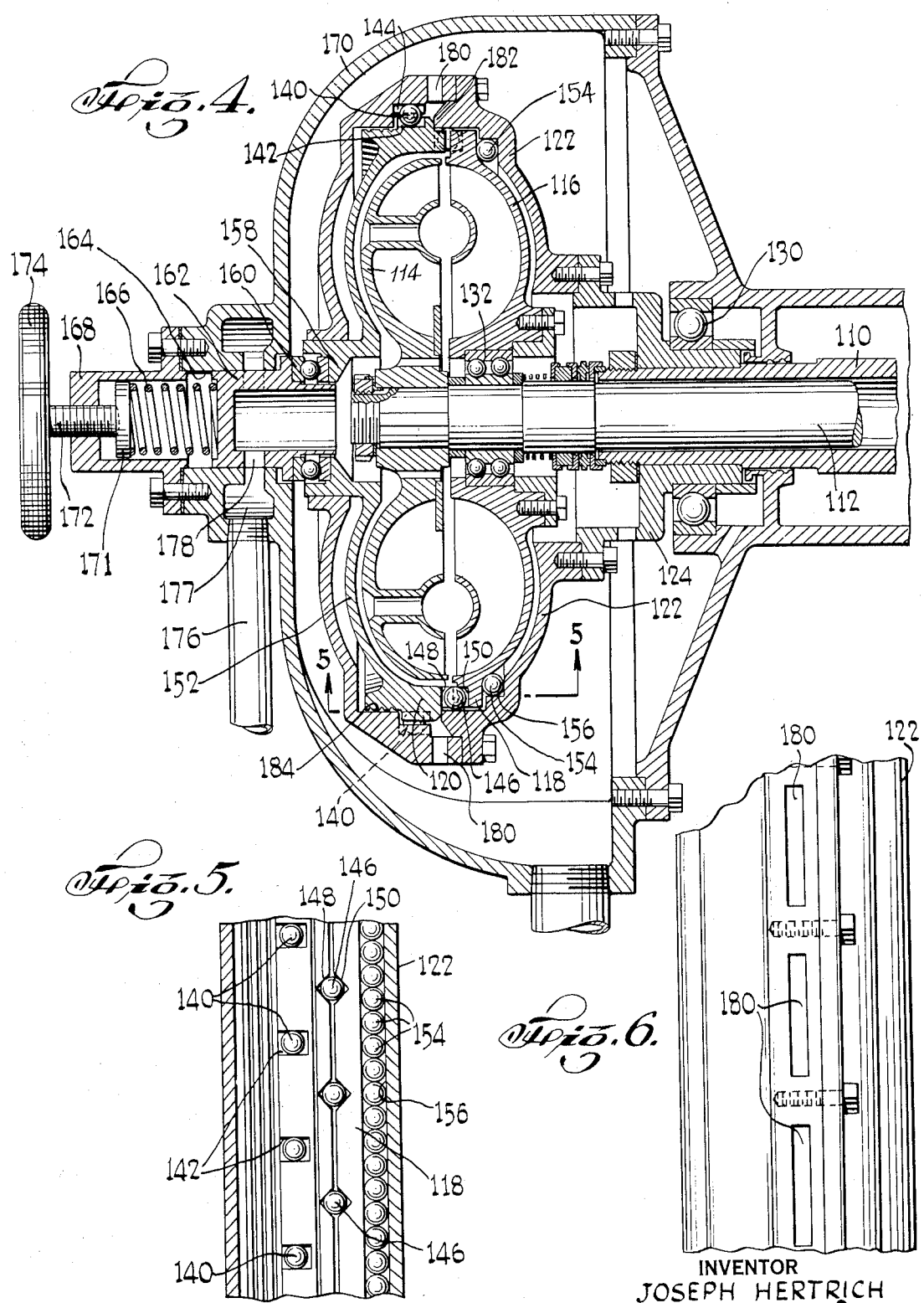

2,380,596

UNITED STATES PATENT OFFICE 2,380,596

TORQUE CONTROL HYDRAULIC CLUTCH OR COUPLING

Joseph Hertrich, Hamilton, Ohio, assignor to The Western States Machine Company, Hamilton, Ohio, a corporation of Utah Application May 21, 1941, Serial No. 394,422

18 Claims. (Cl. 60—54)

This invention relates to new and useful improvements in hydraulic clutches or couplings. The improvements herein disclosed are useful in a wide variety of driving systems for connecting one rotary member with another and limiting and controlling the transmission of torque between the two members.

It is the principal object of my invention to provide new and improved hydraulic clutches and couplings which will develop substantially constant torque or acceleration characteristics under various speed conditions. Other objects are to provide control means exerting a direct and positive control over the torque transmission of hydraulic couplings and, further, to provide such control means which may be regulated while the coupling is operative so as to vary the coupling torque from a low or a zero value to any selected value, as determined by the control means, within the capacity of the coupling.

Another object of my invention is to provide variable torque hydraulic clutches or couplings which respond almost instantly to adjustments of variable torque control means, thereby avoiding the delayed response of known scoop-controlled hydraulic couplings and the like and adapting hydraulic couplings for advantageous use as clutches in driving systems which require quickly acting controls.

Further objects are to provide new torque control hydraulic couplings as aforesaid which may have a continuous large oil discharge for cooling purposes while under heavy load and which will automatically reduce the oil discharge and increase the quantity of oil in the coupling as the running speed is reached and the load falls off, thereby minimizing the slip and loss of energy at running speeds and obtaining a high driving efficiency; and to provide such couplings which may utilize an oil supply that is not necessarily the same as the oil discharged from the coupling, thereby permitting a single oil cooling and oil supply system to be used for a group of couplings.

Still another object of my invention is to provide a variable torque hydraulic clutch or coupling having means for controlling the rate of circulation of oil into and from the coupling during operation, such means being operative to reduce or cut off the oil inflow and to increase or render substantially unlimited the oil outflow, or vice versa, in response to changes in the torque of the coupling itself or to adjustments of the coupling control.

I have discovered that the effective quantity of oil or other liquid in hydraulic clutches or couplings can be controlled in direct response to the torque developed by the coupling at any moment in such manner that a definite torque within the capacity of the coupling may be maintained notwithstanding changes in speed or other operating conditions and without necessary regard to external results of the coupling operation, such as changes in the speed of the driven member. Protection of the driving source against overloads is thus obtained automatically because any overload that may tend to develop will itself cause a compensating reduction in the quantity of oil circulating in, and the torque of, the coupling and will therefore be limited in duration and value. Efficiency of power transmission also is obtained because any underload that may tend to develop will give rise to a compensating increase in the quantity of oil circulating in, and the torque of, the coupling if the coupling is operating at less than its full transmission capacity.

Control over the torque through control over the liquid in the coupling is obtained according to my invention by providing for and utilizing a certain relative motion between a rotary driving member and a rotary driven member embodied in the coupling. These driving and driven members are associated with one of the coupling elements so that any substantial torque or drag on the coupling tends to cause a relative motion between the members toward one limiting position. The coupling is also provided with means for applying a force of definite or predetermined amount in opposition to such relative motion between the members, which force tends to cause relative motion between them toward a different limiting position. By arranging the relatively movable members in association with, or as parts of control means which regulate the rate of oil circulation into or from the coupling, or both, changes in the relative positions of these members are made to change the effective quantity of oil in the coupling. Accordingly, when the torque of the coupling is sufficient to overbalance the force opposing it, a relative motion takes place which automatically reduces the effective quantity of oil until a torque condition is established corresponding to the opposing force; and when the torque of the coupling becomes insufficient to balance the force opposing it, such force causes a relative motion between the control members in another direction, thereby automatically increasing the effective quantity of oil in the coupling and re-establishing a balanced condition.

The aforesaid force acting on the control members consequently is directly proportionate to the torque transmission of the coupling, and for any value of that force there is a corresponding torque characteristic which will not be exceeded by the coupling. It therefore is made possible to adjust the torque developed by the coupling to any desired value within its capacity simply by varying the value of the opposing force applied to the relatively movable control members. This force may be derived, for example, from spring pressure or hydraulic or pneumatic pressure, applied either directly or indirectly through levers, valves, cams or the like; and remote control arrangements may be used which permit ready variation of the applied force during operation of the coupling, thereby directly varying and controlling the torque of the coupling.

The foregoing and other features, objects and advantages of my invention will become more apparent from the following description of illustrative embodiments thereof when considered in connection with the accompanying drawings, wherein Figure 1 is a vertical section through one form of construction embodying the invention;

Figure 2 is a developed fragmentary view showing the periphery of some of the parts as seen substantially along line 2—2 of Figure 1;

Figure 3 is a horizontal cross-section substantially along line 3—3 of Figure 2, showing a detail of the construction;

Figure 4 is a vertical section through another form of construction embodying my invention;

Figure 5 is a developed fragmentary view showing the periphery of some of the parts as seen substantially along line 5—5 of Figure 4; and Figure 6 is an elevation, partly in section, showing parts of the construction of Figure 4.

In the drawings I have shown embodiments of my invention which are designed for connecting and transmitting torque between a hollow shaft 10 and a central shaft 12 extending through the hollow shaft. It will be understood that other clutches or couplings embodying this invention, but differing from the illustrated embodiments in form or design, may be used to connect axially aligned shafts and in various other arrangements.

The shaft 12 extends beyond the end of hollow shaft 10 and has keyed thereto a runner element 14 of the coupling. Facing opposite to the runner is a cooperating impeller element 16, which is connected for rotation with hollow shaft 10 through a ring member 18 secured to the impeller, a ring member 20 cooperating with member 18, a housing 22 connected for rotation with member 20 and a collar 24 which is secured to housing 22, as by bolts 26, and keyed to the hollow shaft 10.

The coupling is shown as designed for operation in vertical position. A thrust ball bearing 30 sustains the axial thrust of the collar 24 and housing 22 assembly. The impeller 16 runs freely on a ball bearing 32 surrounding the shaft 12. The hollow shaft 10 in this arrangement normally is the driving shaft, and the central shaft 12 is adapted to be driven from shaft 10 through the hydraulic clutch or coupling.

The arrangement of the impeller 16 with the ring members 18 and 20 and the housing 22 provides for a slight relative angular and axial movement between the two ring members and, therefore, between the impeller and the housing. Provision is made for this relative movement, for example, by connecting member 20 with housing 22 through a series of balls 40, which are confined within registering axial slots 42 and 44 formed in member 20 and housing 22, respectively, thereby allowing member 20 to have a certain axial movement relative to the housing; and by connecting ring member 20 for rotation with ring member 18 through a series of balls 46 which are confined between oppositely facing cam surfaces 48 and 50 formed on the ring members 20 and 18, respectively, thereby allowing member 18 to have a certain extent of angular movement relative to member 20. It will be evident (see the developed view in Figure 2) that a change in the relative angular positions of members 18 and 20 necessitates a certain change in the axial position of member 20 relative to housing 22, which is allowed by the axial elongation of the slots 42 and 44 in which the balls 40 are confined.

As shown in Figure 1, ring member 20 has attached thereto a thrust plate 52 which is connected to a sleeve 54 that extends above housing 22 and has a flange 56 thereon which forms a seat for a compression spring 58 compressed between the flange and housing 22. Spring 58 tends to hold the thrust plate 52 and ring member 20 in their extreme upper position, thus holding the two ring members apart to the maximum extent and allowing member 18 to reach the limit of its angular movement relative to member 20.

Bearing against the thrust plate 52, through a ball bearing 60, is a plunger 62 which works in a cylinder 64 at the top of a stationary oil-collecting casing 66. An inlet pipe 68 admits a fluid pressure medium, either hydraulic or pneumatic, into the cylinder 64 whereby to force plunger 62 downward and apply a pressure on the thrust plate 52, thus overcoming the resistance of spring 58 and tending to force the ring members 18 and 20 toward a limiting relative position such as indicated generally in Figures 2 and 3, with the results hereinafter described.

The illustrated construction is one providing for circulation of oil or other liquid through the coupling during operation. This circulation takes place as follows: oil from an inlet pipe 70 is introduced into a bore 72 in the top of the casing 66 and thence into the hollow plunger 62 through opening 74 in the side wall thereof. Oil passes from the plunger over the runner 14 and inside the coupling elements through bores 76 and 78 in the runner. One of the ring members is made to serve the function of a valve controlling the discharge of oil from the coupling through outlets 82 in housing 22. For example, one or more discharge openings 80 may be provided in ring member 18 in such position as to be either partly or wholly in registry or entirely out of registry with the openings 82. See Figure 3. The openings 80 and 82 preferably are made large enough to allow a flow of oil that will cause quick emptying of the coupling whenever they are brought into registry with the coupling in operation, the centrifugal force on the oil being sufficient to effect a rapid discharge thereof. Oil discharged through openings 82 is collected by the casing 66 and drawn off through a pipe 67, whence it may pass into a collecting tank (not shown) for subsequent cooling and return to the coupling through the inlet 70.

The inlet pipe 68 leading into cylinder 64 may extend from a remote control point, where it may be equipped with a pressure regulating valve 86, controlled by a lever 88, by which to vary the pressure of fluid on plunger 62 and thus to vary the amount of force tending to move ring member 20 toward its lowermost position relative to ring member 18.

Referring now to the operation of the illustrated construction, it is to be noted that in one limiting position, the lowermost, of member 20 relative to member 18, the latter is necessarily disposed in such relation to the former and to casing 22 that the openings 80 are substantially out of registry with openings 82 so that little or no oil may be discharged from the coupling under such conditions. Also, openings 74 in plunger 62 overlie the oil inlet bore 72, so that oil may enter the coupling and keep the same full or nearly full of liquid. In other words, this is the condition of maximum torque transmission with minimum slip for any given speed conditions. It is further to be noted that the torque of the coupling itself, acting on the impeller 16, always tends to move the impeller and member 18 to the limit of their possible angular movement relative to member 20 and casing 22, which is also to say that the torque of the coupling itself tends to overcome the effective pressure of the fluid medium in cylinder 64 and, in proportion to the extent that it does so, to cause movement of the openings 80 into alignment with some of the openings 82.

There is consequently a definite relationship between the torque of the clutch or coupling and the pressure on the thrust plate that tends to keep the discharge openings closed and hold oil in the coupling. When this pressure is insufficient to overcome the force of spring 58, any torque produced by the coupling will move impeller 16 and member 18 to a position in which the coupling empties itself and becomes inactive. When the pressure on the thrust plate exceeds the force of spring 58, there is a corresponding torque value which will be developed and automatically prevented from being exceeded; for if the torque becomes greater than such value it will displace the ring members and increase the oil discharge so as to reduce the quantity of oil in the coupling, and if the torque becomes less than such value the pressure opposing it will displace the ring members and restrict the oil discharge so as to increase the quantity of oil in the coupling. Consequently, the torque transmission is varied and controlled by varying the pressure on the thrust plate 52, as by adjustment of the pressure regulating valve 86; and for any given pressure on the thrust plate, there will be a definite torque transmission capacity which automatically will be held substantially uniform, regardless of the speed of the driving or driven shafts.

When an equilibrium condition exists between the torque of the coupling and the force opposing it, this force is divided over the total number of balls 46, and for each ball there is a definite resulting tangential force which balances a torque component and determines the torque value of the coupling. This torque value is equal to such unit tangential force times the number of balls 46 times the radius of rotation of the balls. As soon as the torque of the coupling exceeds this value a relative angular movement of member 18 takes place in response thereto, and a corresponding relative axial movement of member 20 takes place in a direction away from member 18; and as soon as the torque of the coupling becomes lower than this value relative movements take place in the opposite directions.

It will be understood that the range of torque variation or control for any particular coupling cannot exceed the torque capacity of the coupling, and that the torque developed at any time will not exceed the torque requirements of the driven shaft. For example, if the control force is set so that the coupling will deliver a torque of 100 ft. pounds and the coupling when completely filled has a torque capacity of 100 ft. pounds at a slip of 4%, this coupling will deliver a torque of 100 ft. pounds as long as it is operating with a slip of 4% or more. On the other hand, when the coupling is operating at a slip of less than 4% the torque will be less than 100 ft. pounds and will correspond to the torque capacity of the coupling at that particular slip with 100% filling. Similarly, on any other occasion when the inertia of the driven shaft does not demand the full 100 ft. pound torque for which the control is set, the slip of the coupling will be reduced until the torque demand is balanced by the torque of the coupling, and whenever this condition arises the coupling will automatically work with 100% filling.

By providing a series of openings 82 on either side of the openings 80, the torque control system is made to function in either direction of torque transmission; that is to say, not only when the drive is from the hollow shaft 10 to the central shaft 12, but also when the drive is from shaft 12 to shaft 10.

A further feature of the illustrated construction is that the arrangement of openings 74 relative to bore 72 forms a fluid inlet valve that is controlled by the positions of the relatively movable members and is open only when the coupling is active. Upon the release of pressure from plunger 62 the coupling empties itself automatically through the discharge openings 80 and 82, and at the same time the flow of oil into the coupling is cut off. This prevents oil from flowing through the coupling and producing a slight drag thereon when the drive is disconnected. The exceedingly rapid discharge of liquid under centrifugal force and the simultaneous stoppage of liquid inflow result in an almost instantaneous inactivation of the coupling when desired.

It will be apparent that with a constant rate of oil discharge, control of the coupling torque may be obtained through variation of the oil inflow only, but at the sacrifice of the quick disconnection feature.

A further feature of importance in the application of the coupling to heavy-duty cyclical work, requiring frequent acceleration of heavy loads, is that the drive or power transmission of the coupling is quite efficient at all times. During acceleration the torque of the coupling may be held at that value which is best adapted to obtain the desired acceleration rate and prevent overloading of the driving member, and during this stage of heavy load and large heat generation there may be a continuous oil circulation at a rate sufficient to keep the coupling cool and operating efficiently. As soon as the driven member has been brought to full running speed, the torque requirements drop off, and the flow of oil through the discharge openings 82 is automatically restricted. The coupling thereupon may become completely full of oil and produce its maximum coupling effect with a minimum of slip between the runner and the impeller. This results in maximum driving efficiency at full speed and minimizes the heat generated in the coupling during that stage of operations. Furthermore, the automatic restriction of oil discharge at full speed results in little or no energy being lost on that account.

Since the rate of supplying oil to the coupling does not depend upon the rate of discharge therefrom, a single oil tank and cooler can be used to supply oil for a group of couplings.

In Figures 4 to 6, inclusive, I have illustrated a modified form of hydraulic clutch or coupling, designed for horizontal application. The principal differences between this form and the form already described are that provision is made for more rapid emptying of the coupling, accompanied by a smaller extent of relative movement between the torque control members; that manufacture of the coupling parts is simplified; and that control over the torque of the coupling is shown as being effected through the action of a compression spring, instead of by fluid pressure.

As seen in Figure 4, there is a hollow driving shaft 110, a central driven shaft 112, a runner 114 keyed to the end of shaft 112 and an impeller 116 connected for rotation with shaft 110 through a ring member 118 integral with the impeller, a cooperating ring member 120 integral with the thrust plate 152, a housing 122 connected for rotation with member 120 and a collar 124 secured to housing 122 and keyed to the hollow shaft 110. The collar 124 and the impeller 116 run on bearings 130 and 132, respectively. Balls 140, confined between oppositely facing axial grooves 142 and 144, connect the housing 122 and member 120 for rotation together. Balls 146, confined between oppositely facing angular surfaces 148 and 150 on members 120 and 118, respectively, connect the impeller for rotation with the housing assembly while allowing a certain degree of relative angular movement therebetween. A series of supporting ball bearings 154 may be provided between the impeller 116 and a ball race 156 on the inside of housing 122.

The thrust plate 152 presents an annular seat 158 for a thrust ball bearing 160 which receives the thrust of a plunger 162 working in a cylinder 164. A compression spring 166 is confined in cylinder 164 by a cap 168 secured to the end of the oil-collecting housing 170. A follower 171 bears on the spring 166 and is adapted to be moved, to vary the force of the spring, by means of a screw 172 having a handle 174 thereon.

Oil is admitted into the coupling from a supply pipe 176 through a bore 177 in the end of housing 170 and an opening 178 in the hollow plunger 162. The inflowing oil passes into the coupling in the same manner as indicated in Figure 1.

To effectuate the discharge of oil from the coupling, the housing 122 is formed with elongated oil discharge openings 180, and the ring member 120 is formed to cooperate with the housing and constitute a valve controlling the rate of oil discharge. For example, member 120 is adapted to abut against a seat 182 on the inside of the housing and to form a sliding seal with a cylindrical surface of the housing, as at 184. When the pressure of spring 166 holds member 120 against the seat 182, there may be little or no discharge of oil from the coupling, and when the torque of the coupling causes a relative movement between members 118 and 120, the latter may be moved away from seat 182 to a slight extent so as to allow the discharge of oil from the coupling throughout its circumference.

The operation of the form of construction shown in Figures 4 to 6 is similar to that of the construction of Figures 1 to 3, and therefore need not be described in detail.

Although I have illustrated and described certain embodiments of my invention which represent presently preferred forms of construction, it will be evident that many of the features and details of the illustrated embodiments may be varied or dispensed with altogether without departing from the broader contributions of my invention, which may be embodied in numerous forms and arrangements of hydraulic clutches or couplings.

I claim:

1. A hydraulic coupling comprising relatively angularly movable rotary driving and driven members arranged to be urged toward a limiting relative angular position by the torque of the coupling, force-applying means for urging said members toward another limiting relative angular position in opposition to such torque, means controlled automatically according to the relative angular positions of said members for controlling the effective amount of liquid in the coupling, and manually operable control means for varying the force of said force-applying means so as to select the maxium torque of the coupling.

2. Hydraulic coupling means comprising oppositely facing coupling elements and a housing for holding liquid between said elements, means connecting one of said elements for rotation with and for limited relative angular movement with respect to said housing, whereby said means and said one element are shiftable in response to the torque on said one element, means operated by such shifting movement for governing the quantity of liquid within said housing, and adjustable means for imposing a definite but variable resistance against shifting of said means and said element in response to such torque whereby to vary and control the torque of the coupling means.

3. In a hydraulic clutch or coupling comprising oppositely facing coupling elements and a housing for holding liquid between said elements, means connecting said housing for rotation with one of said elements while allowing limited relative angular movement therebetween, said means including a member connected with said housing and with said one element for axial movement relative thereto in response to such relative angular movement, and means connected with said member for urging the same toward one limit of its axial movement.

4. A power transmission device comprising oppositely facing hydraulic coupling elements and a housing for holding liquid between said elements, a ring member within said housing, means connecting said ring member for rotation with and limited axial movement relative to said housing, means connected with said ring member for yieldably thrusting the same toward one limit of its axial movement, means connecting said ring member for rotation with one of said elements while allowing limited relative angular movement therebetween, said last-recited means including cam means operative to thrust said ring member toward the other limit of its axial movement in response to relative angular movement of said one element, and means controlled according to the axial position of said ring member for regulating the quantity of liquid in said housing.

5. A power transmission device comprising oppositely facing hydraulic coupling elements and a housing for holding liquid between said elements, a ring member within said housing, means including balls confined between axial grooves in said ring member and registering axial grooves in said housing for connecting said ring member to rotate with and slide axially relative to said housing, pressure-applying means connected with said ring member for thrusting the same toward one limit of its axial movement, means including oppositely facing cam surfaces on said ring member and one of said elements, respectively, and balls confined between said surfaces for connecting said ring member to rotate with said one element while allowing limited relative angular and axial movement therebetween in opposition to the thrust of said pressure-applying means, and valve means controlled according to the relative positions of said ring member and said one element for regulating the quantity of liquid in said housing.

6. A power transmission device comprising oppositely facing hydraulic coupling elements and a surrounding rotary housing for holding liquid between said elements, liquid outlet means in the wall of said housing, cooperating ring members within said housing, means connecting one of said ring members for rotation with and limited axial movement relative to said housing, means securing another of said ring members for rotation with one of said elements, means connecting said ring members for simultaneous rotation while allowing limited relative angular movement therebetween upon axial movement of said one member, and pressure-applying means connected with said one member for thrusting the same toward one limit of its axial movement, at least one of said members having means cooperating with said outlet means for controlling the discharge of liquid through said outlet means according to the relative positions of said members.

7. A power transmission device comprising oppositely facing hydraulic coupling elements and a surrounding rotary housing for holding liquid between said elements, liquid discharge openings in the wall of said housing, cooperating ring members within said housing including one member connected with said housing for axial movement relative thereto to and away from a closed position blocking the discharge of liquid through said openings, another ring member secured for rotation with one of said elements and means connecting said ring members for simultaneous rotation and for limited relative angular movement therebetween and corresponding axial movement of said one member in response to a torque on said one element, pressure-responsive means connected with said one member for yieldably thrusting the same axially toward closed position, and variable control means for varying the pressure applied to said pressure-responsive means.

8. A power transmission device comprising oppositely facing hydraulic coupling elements and a surrounding rotary housing for holding liquid between said elements, an inlet port for admitting liquid into said housing, liquid discharge openings in the wall of said housing, cooperating ring members within said housing for controlling the rate of liquid discharge through said openings, said ring members including one member connected with said housing for rotation therewith and axial movement relative thereto, another member on the periphery of one of said elements and means connecting said members for simultaneous rotation and for limited relative angular movement and corresponding axial movement of said one element in response to torque on said one element, fluid-pressure responsive means connected with said one member for yieldably thrusting the same in axial direction in opposition to such torque, variable control means for applying fluid pressure to said pressure-responsive means, and movable means controlled according to the relative positions of said ring members for controlling the liquid inflow through said inlet port.

9. A power transmission device comprising oppositely facing hydraulic coupling elements and a surrounding rotary housing for holding liquid between said elements, liquid discharge openings in the wall of said housing, cooperating ring members within said housing including one member connected with said housing for rotation therewith and axial movement relative thereto, another member secured to the periphery of one of said elements and means connecting said members for simultaneous rotation and for limited relative angular movement and corresponding axial movement of said one member in response to torque on said one element, said other member having openings therein adapted to move angularly into and out of registry with said discharge openings and thereby to control the discharge of liquid therethrough upon relative angular movement between said elements, and pressure-applying means connected with said one member for yieldably thrusting the same in axial direction in opposition to such torque.

10. A hydraulic coupling comprising a rotary drive-transmitting member, oppositely facing hydraulic coupling elements, means connecting one of said elements for rotation with and for limited relative angular movement with respect to said member, whereby said element is urged in one direction of such relative movement by the torque of the coupling, adjustable means for applying a predetermined yieldable force to urge said one element in the opposite direction of such relative movement, means for rendering said force-applying means active and inactive, and means operated by relative movements between said member and said one element to increase the liquid contained in the coupling when such force overbalances such torque and to decrease the liquid contained in the coupling when such torque overbalances such force, whereby automatically to limit the accelerating torque of the coupling to a predetermined value, said means being operative to empty the coupling substantially instantaneously whenever said force applying means is rendered inactive.

11. A hydraulic coupling comprising, in combination with oppositely facing hydraulic coupling elements, a rotary housing connected in driving relation to one of said elements and having a limited relative angular movement with respect thereto, whereby said one element is urged in one direction of such relative movement by the torque of the coupling, means for applying a predetermined yieldable force to said one element in opposition to such torque, means automatically responsive to relative angular movements between said housing and said one element for controlling the filling and thereby the torque of the coupling, and remote control means for activating and inactivating said force applying means whereby to establish and terminate power transmission by the coupling.

12. In a hydraulic coupling, a rotary housing, oppositely facing hydraulic coupling elements therewithin and control means including a relatively movable member adjacent the periphery of one of said elements connecting the same for rotation with and for limited angular movement with respect to said housing.

13. In a hydraulic coupling, a rotary housing, oppositely facing hydraulic coupling elements therewithin, an annular control member inside said housing adjacent the periphery of one of said elements, means connecting said member for rotation with and limited axial movement relative to said housing and means connecting said member for rotation with and for limited axial and angular movement relative to said one element.

14. In a hydraulic coupling, a rotary housing, oppositely facing hydraulic coupling elements therewithin, a ring member inside of said housing adjacent the periphery of one of said elements, cooperating axial groove and ball means connecting said member for rotation with and limited axial movement relative to said housing, and cooperating cam and ball means connecting said member for rotation with and limited axial and angular movement relative to said one element.

15. In a hydraulic coupling, a rotary housing, oppositely facing hydraulic coupling elements therewithin, means including an axially movable ring member connecting one of said elements for rotation with and for limited angular movement with respect to said housing whereby said one element is urged in one direction of such relative movement by the torque of the coupling, means for applying a predetermined force to said ring member to urge the same axially and said one element angularly in a direction opposing said torque, and plural valve means respectively operative according to the axial position of said ring member for admitting liquid into and exhausting liquid from said housing.

16. A hydraulic coupling comprising a rotary housing, oppositely disposed hydraulic coupling elements therewithin, means including a shiftable member connecting one of said elements for rotation with and for limited relative angular movement with respect to said housing, a circular series of openings in said housing adjacent the periphery of said coupling elements for exhausting liquid from the coupling, and means operative according to the relative positions of said one element and said housing for closing off or exposing said openings.

17. A hydraulic coupling comprising a rotary housing, oppositely disposed hydraulic coupling elements therewithin, means including a shiftable member connecting one of said elements for rotation with and for limited relative angular movement with respect to said housing, concentrically disposed non-rotary valve means for admitting liquid into said housing, a circular series of openings in said housing adjacent the periphery of said elements for exhausting liquid from said housing, and coordinated means operative according to the relative positions of said member for controlling the action of said valve means and for closing off or exposing said openings.

18. In a power transmission system including a hydraulic coupling and means for varying the filling of the same, means constantly reactive to the torque of the system for shifting said means so as to reduce the filling of the coupling, means for applying to said reactive means a predetermined force tending to counteract such torque and shift said means so as to increase the filling of the coupling, whereby to render the maximum torque of the system directly proportionate to said force, manually operable means for activating and inactivating said force-applying means so as to establish and terminate, respectively, power transmission by the system, said force-applying means including fluid pressure supplying means and said manually operable means including a variable pressure regulating valve.

JOSEPH HERTRICH.